(12) United States Patent
Schwochert (10) Patent No.: US 6,183,683 B1
(45) Date of Patent: Feb. 6, 2001

(54) METHOD AND APPARATUS FOR TRANSPORTING PLASTICS IN A MELTED STATE

(75) Inventor: Hans Schwochert, Windsor (CA)

(73) Assignee: Schwochert Inc. (CA)

( * ) Notice: Under 35 U.S.C. 154(b), the term of this patent shall be extended for 0 days.

(21) Appl. No.: 09/156,786

(22) Filed: Sep. 17, 1998

Related U.S. Application Data (63) Continuation of application No. 08/919,887, filed on Aug. 28, 1997, now abandoned, which is a continuation of application No. 08/337,274, filed on Nov. 10, 1994, now abandoned.

(30) Foreign Application Priority Data

Nov. 11, 1993  (GB) .................................................. 9323267

(51) Int. Cl.⁷ .................................................. B29C 49/34
(52) U.S. Cl. .......................... 264/531; 264/526; 264/534; 264/542; 425/534
(58) Field of Search ............................ 425/534; 264/540, 264/526, 531, 542

(56) References Cited

U.S. PATENT DOCUMENTS

| 3,000,051 | 9/1961 | Schaich ........................ 18/5 |
|---|---|---|
| 3,225,382 | 12/1965 | Hagen ..................... 425/531 |
| 3,294,884 | 12/1966 | Fischer et al. ........................ 264/542 |
| 3,304,357 | 2/1967 | Langecker ............. 264/150 |
| 3,325,860 | 6/1967 | Hansen ................................. 264/542 |
| 3,357,046 | 12/1967 | Pechthold ............................. 264/540 |
| 3,504,397 | 4/1970 | Langecker ............................. 264/533 |
| 3,525,123 | 8/1970 | Cines et al. ......................... 264/533 |
| 3,659,984 | 5/1972 | Krstolic .................................... 425/72 |
| 3,691,267 | 9/1972 | Takehara .............................. 264/542 |
| 3,708,253 | 1/1973 | Lemelson ............................. 425/155 |
| 3,897,670 | 8/1975 | Hansen ................................. 425/532 |
| 4,153,408 | 5/1979 | Albert et al. ......................... 425/532 |
| 4,761,130 | 8/1988 | Peters ................................... 425/532 |
| 4,770,839 | 9/1988 | Legge ................................... 264/526 |

FOREIGN PATENT DOCUMENTS

| 1163000 | 2/1964 | (DE) . |
|---|---|---|
| 4031697 | 4/1992 | (DE) . |
| 1453349 | 8/1966 | (FR) . |

*Primary Examiner*—Jan H. Silbaugh
*Assistant Examiner*—Suzanne E. McDowell
(74) *Attorney, Agent, or Firm*—Webb Ziesenheim Logsdon Orkin & Hanson, P.C.

(57) ABSTRACT

A method and apparatus is provided to transport parisons from the extrusion die to a second location. The parison is extruded and a collar means is provided to contact the parison near its upper end and create a holding geometry whereby the parison is retained by the collar means without pinching the parison. The parison is then transported vertically or horizontally to the mold unit without closing or pinching the parison. The holding geometry is created by slightly deforming the parison wall near the collar means. The parison is therefore transported to the second location, for example a mold unit, instead of moving the mold unit, to the parison.

6 Claims, 11 Drawing Sheets

METHOD AND APPARATUS FOR TRANSPORTING PLASTICS IN A MELTED STATE

CROSS REFERENCE TO RELATED APPLICATIONS

This Application is a continuation of U.S. application Ser. No. 08/919,887, filed Aug. 28, 1997 now abandoned, which is a continuation of U.S. application Ser. No. 08/337,274, now abandoned, filed Nov. 10, 1994 which claims priority from United Kingdom Application No. 9323267.6, filed Nov. 11, 1993.

FIELD OF THE INVENTION

This invention relates in general to a method and apparatus for making hollow plastic products, and more particularly to a method and apparatus for transporting the parison of molten plastic to the mold units without pinching the parison.

BACKGROUND OF THE INVENTION

It is well known in the art to make hollow plastic products such as containers or other like products using the extrusion blow-molding process. In the extrusion blow-molding process, plastic in a melted state is introduced into a mold. The molten plastic is generally extruded into a cylindrically-shaped tube or hose referred to as a parison. The mold is closed and the interior of the mold is then pressurized to force the melted plastic onto the interior walls of the mold, which is then allowed to cool so that the plastic solidifies. The end product is a hollow plastic product having the shape of the interior of the mold. In some applications, such as the production of fuel tanks for automobiles, the parisons may be 8 feet or more in length.

In the extrusion blow-molding process, the parison is formed by pressing the melted plastic through a die in one of two ways, either by the accumulator method or by the continuous extrusion method. In the accumulator method, a hydraulic means intermittently forces the melted plastic through the die to form the parisons. In the continuous method, the melted plastic flows continuously through the die to form the parison.

Previously, only small and mid-size plastic hollow products could be produced using the continuous extrusion blow-molding method. Recent developments in the art of blow-molding have allowed the production of larger sized products using the continuous method. In order to produce the larger containers, however, correspondingly larger equipment is required. As well, the parison must be correspondingly larger in diameter and length.

For this reason, two different versions of the continuous extrusion blow-molding process are known. In the first version, the die is located above the mold unit and the parison is transported vertically down into the mold unit. The disadvantage with this version of the method is that the equipment is very tall where large products are to be produced. In some applications, the equipment can be as high as 40 to 45 feet. Therefore, much taller buildings are required to house the equipment.

A further disadvantage of the vertical transportation version of the continuous process is that the parison must be carried into the mold unit, which is now done by pinching the upper end of the parison, separating it from the die and lowering it into the mold unit. This pinching and vertical movement, however, often causes the larger sized parisons to collapse or flatten onto each other. That is, the pinching of the upper end causes the parison wall to collapse throughout the entire length of the parison rather than the parison retaining its generally cylindrical shape. This creates further difficulties in the overall manufacturing process since the lower end of the parison closes, thereby preventing the parison from being located properly in the mold area. By "pinching" it is meant that the wall of the parison is closed.

The second version of the continuous extrusion process includes shuttling of the machine clamping units. In this method, at least two mold units mounted on individual clamping units are used for each parison-forming die. The die is typically located between the two or more mold units, and the clamping units are each moved in turn under the die so the mold units can receive the parison. Thus, this method requires a substantial amount of floor space in order to operate the equipment and accommodate the two or more clamping units. As well, the clamping units used for larger products can be very heavy (up to 100,000 lbs each), therefore they must be mounted on moving steel frame structures with drives and rails. This, of course, makes the equipment relatively very expensive. As well, the power consumption required to accelerate, move and stop the units is great.

Various devices for carrying parisons are disclosed in the art. In U.S. Pat. No. 3,000,051, a method and apparatus for manufacturing hollow articles from melted plastic tubes (i.e. parisons) is disclosed. Also disclosed is a method and apparatus for handling a heated, vertically extruded tube or rod of thermal plastic material prior to enclosing the tube into a mold. The parison is extruded between two vertically-spaced pairs of horizontally aligned holding members. The two lower holding members are provided in opposed vertical surfaces with identical tube-engaging notches having a generally tapered configuration. The parison is extruded and the bottom tube holding members are moved toward each other until they abut. At that point, the cooperating notches define an aperture that is somewhat smaller than the diameter of the extruded parison so that the lower portions of the parison are grasped with sufficient firmness by the holding members to provide vertical support for the parison. On the other hand, the top pair of tube holding members also have tube engaging notches, but the aperture defined by the top tube holding members is slightly larger than the diameter of the parison so that the top holding members do not engage the parison wall. Therefore, only the bottom pair of tube holding members actually engage and vertically support the parison. The top tube holding members do not engage the parison wall. As well, the parison is only moved vertically from the extruder to the mold; there is no mention of the holding members being capable of moving the parison horizontally.

U.S. Pat. No. 4,153,408 discloses a gripping device for holding the parison, and a method for extrusion blowing hollow articles in which the parison is transferred from the extrusion die to a blow mold by means of the gripper device. The gripper device includes gripper jaws that grip the parison as it issues from the extruder. The gripper jaws move in scissor-like fashion so that the top of the parison is pinched by the gripper jaws. Therefore, this gripper device requires the parison to be pinched in order to be retained within the gripping device.

U.S. Pat. No. 4,761,130 discloses a method and apparatus for blow-molding square-shaped articles. The parison must be pinched at both ends. U.S Pat. No. 4,770,839 also discloses a blow-molding method in which the parison must be pinched.

The present invention eliminates the disadvantages of the prior art, and of the vertical transportation and shuttling versions of the continuous extrusion blow-molding process known so far. The present invention provides a parison carrying device that carries the parison to the mold unit without moving the mold units themselves, without requiring the mold unit to be located immediately under the die and without pinching the parison. The parison carrying device of the present invention includes a collar means that retains the parison without pinching the parison wall thus minimizing the likelihood of the parison collapsing. The present invention also provides means for closing the upper end of the parison without necessarily pinching the parison wall in applications where the interior of the parison is pressurized prior to the mold closing.

SUMMARY OF THE INVENTION

According to one aspect of the present invention, a method is provided for transporting a parison from an extrusion die to a second location, the parison having an upper end and an outside wall, comprising the steps of:

a) vertically extruding the parison from the die;

b) providing a collar means having an inner face capable of contacting the outside wall near the upper end of the parison;

c) creating a holding geometry between the collar means and the parison by contacting the inner face with the outside wall, whereby the parison is retained by the collar means without pinching the parison;

d) separating the parison from the die without pinching the parison; and e) transporting the parison to the second location by moving the collar means without pinching the parison.

According to another aspect of the present invention, a method is provided for transporting a cylindrically-shaped parison from a die to a mold unit, the parison having an upper end and inside and outside walls, comprising the steps of:

a) extruding the parison from the die;

b) providing a collar means having an inner face capable of contacting the outside wall near the upper end of the parison, the inner face including notches;

c) providing a disc-shaped core member disposed adjacent the die such that the core member is located inside the cylindrical parison during extrusion of the parison from the die and the peripheral face of the core member contacts the inside wall, the core member having a plurality of inner passages extending radially outwardly from the core member and terminating at the peripheral face of the core member;

d) applying pressure in the inner passages such that the parison wall contacting the peripheral face is forced into the notches to create a holding geometry between the collar means and the parison such that the parison is retained by the collar means without pinching the parison;

e) separating the parison from the die without pinching the parison; and f) transporting the parison to the mold unit by moving the collar means without pinching the parison.

According to a further aspect of the present invention, a method is provided for transporting a cylindrically-shaped parison from a die to a mold unit, the parison having an upper end and inside and outside walls, comprising the steps of:

a) extruding the parison from the die;

b) providing a collar means having a slanted inner face capable of contacting the outside wall near the upper end of the parison;

c) providing a disc-shaped core member disposed adjacent the die such that the core member is located inside the parison during extrusion of the parison, the core member having a peripheral face that contacts the inside wall of the parison during extrusion, the peripheral face being slanted in a direction opposite to the slanted inner face of the collar means such that the peripheral and inner faces cooperate with each other;

d) contacting the collar means with the outside wall to trap the parison between the cooperating peripheral and inner faces to create a holding geometry between the collar means and the parison such that the parison is retained by the collar means without pinching the parison;

e) separating the parison from the die without pinching the parison; and f) transporting the parison to the mold unit by moving the collar means without pinching the parison.

According to yet a further aspect of the present invention, a method is provided for transporting a cylindrically-shaped parison from a die to a mold unit, the parison having an upper end and inside and outside walls, comprising the steps of:

a) extruding the parison from the die;

b) providing a collar means having an inner face and two slidably mounted elements on the inner face defining a notch, the inner face capable of contacting the outside wall near the upper end of the parison;

c) contacting the inner face with the outside wall;

d) slidably moving the elements toward each other to trap a portion of the parison in the notch defined by the elements and create an annular ridge around the parison, thereby creating a holding geometry between the collar means and the parison such that the parison is retained by the collar means without pinching the parison;

e) separating the parison from the die without pinching the parison; and f) transporting the parison to the mold unit by moving the collar means without pinching the parison.

According to yet a further aspect of the present invention, an apparatus is provided for transporting a cylindrically-shaped parison from an extrusion die to a second location, the parison being vertically extruded from the die and having an upper end and an outside wall, comprising:

a) collar means having an inner face capable of contacting the outside wall near the upper end of the parison;

b) means associated with the collar means for bringing the inner face into contact with the outside wall to create a holding geometry between the inner face and the parison such that the parison is retained by the collar means without pinching the parison; and c) means for moving the parison away from the die thereby separating the parison from the die without pinching the parison and for transporting the parison to the second location by moving the collar means without pinching the parison.

According to yet a further aspect of the present invention, an apparatus is provided for transporting a cylindrically-shaped parison from an extrusion die to a second location, the parison being vertically extruded from the die and having an upper end and inside and outside walls, comprising:

a) collar means having an inner face capable of contacting the outside wall near the upper end of the parison;

b) a plurality of notches on the inner face;

c) a disc-shaped core member disposed adjacent the die such that the core member is located inside the cylindrical parison during extrusion of the parison and the peripheral face of the core member contacts the inside wall;

d) a plurality of inner passages in the core member extending radially outwardly from the core member and terminating at the peripheral face of the core member and opposite the notches;

e) means associated with the collar means for bringing the inner face into contact with the outside wall;

f) means for applying pressure in the passages such that the parison contacting the peripheral face is forced against the notches to create a holding geometry between the collar means and the parison such that the parison is retained by the collar means without pinching the parison; and g) means for moving the parison away from the die thereby separating the parison from the die without pinching the parison and for transporting the parison to the second location by moving the collar means without pinching the parison.

According to yet a further aspect of the present invention, an apparatus is provided for transporting a cylindrically-shaped parison from an extrusion die to a second location, the parison being vertically extruded from the die and having an upper end and inside and outside walls, comprising:

a) collar means having a slanted inner face capable of contacting the outside wall near the upper end of the parison;

b) notches on the inner face;

c) a disc-shaped core member disposed adjacent the die such that the core member is located inside the cylindrical parison during extrusion of the parison, the core member having a peripheral face that contacts the inside wall;

d) the peripheral face being slanted in a direction opposite to the inner face of the collar means such that the peripheral and inner faces cooperate with each other;

e) means associated with the collar means for bringing the inner face into contact with the outside wall to trap the parison between the cooperating peripheral and inner faces; and f) means for moving the parison away from the die thereby separating the parison from the die without pinching the parison and for transporting the parison to the second location by moving the collar means without pinching the parison.

According to yet a further aspect of the present invention, an apparatus is provided for transporting a cylindrically-shaped parison from an extrusion die to a second location, the parison being vertically extruded from the die and having an upper end and inside and outside walls, comprising:

a) collar means having an inner face capable of contacting the outside wall near the upper end of the parison;

b) two slidably mounted elements on the inner face defining a notch between them;

c) means associated with the collar means for bringing the inner face into contact with the outside wall;

d) means for slidably moving the elements toward each other to trap a portion of the parison in the notch defined by the elements and create an annular ridge around the outside of the parison, thereby retaining the parison in the collar means; and e) means for moving the parison away from the die thereby separating the parison from the die without pinching the parison and for transporting the parison to the second location by moving the collar means without pinching the parison.

BRIEF DESCRIPTION OF THE DRAWINGS

The present invention will be described in detail with reference to the accompanying drawings, in which like numerals denote like parts in the several views, and in which.

DETAILED DESCRIPTION OF THE PREFERRED EMBODIMENTS

Figure 1:
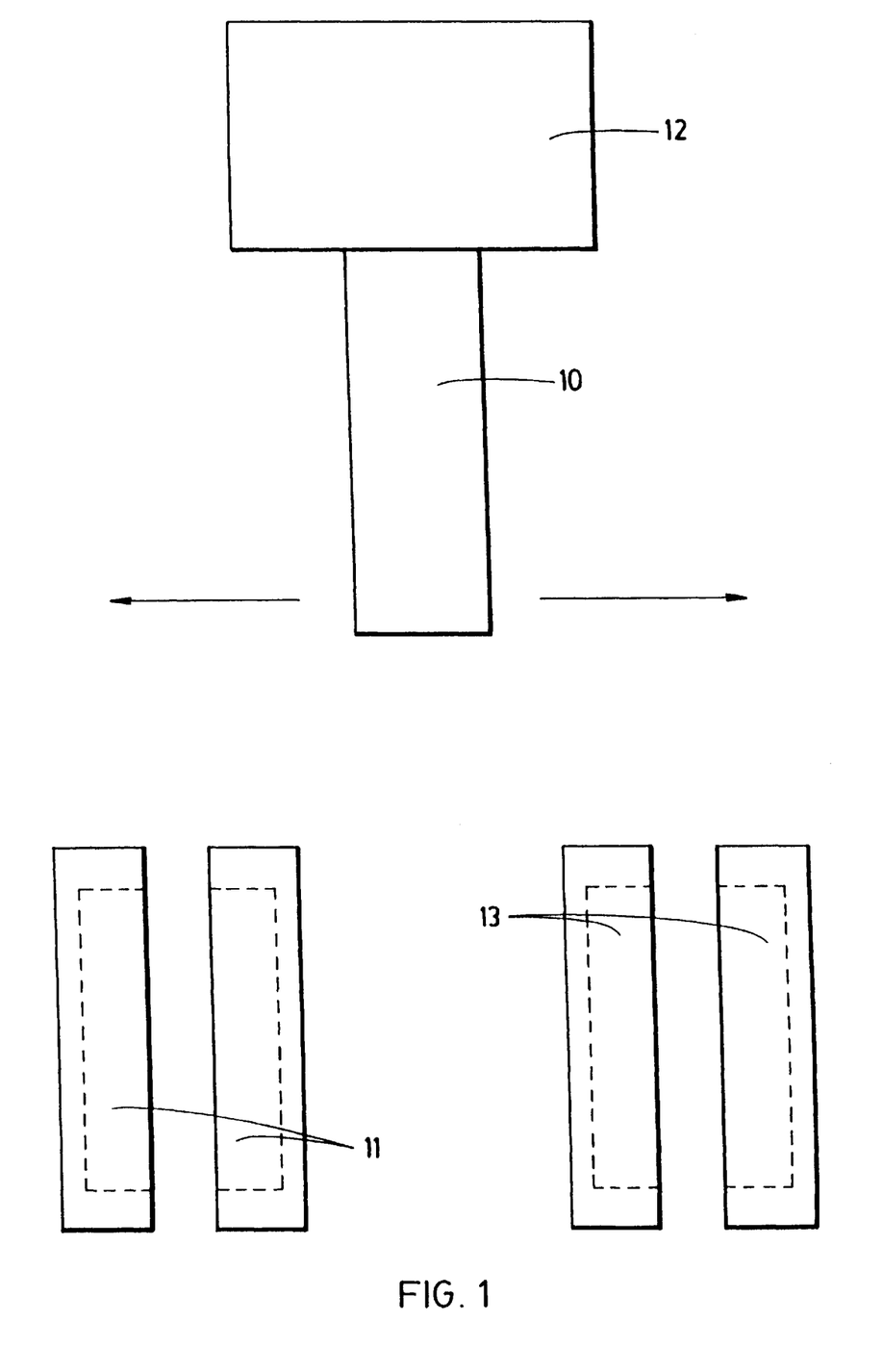
FIG. 1 is a schematic drawing showing in a general way the method and apparatus of the present invention.

Referring to FIG. 1, one embodiment of the process of the present invention is illustrated in a general way. A generally cylindrically-shaped parison 10 is shown formed by passage of melted plastic through a die 12. The parison 10 is formed generally in the shape of a cylinder, but other shapes may also be used. Two mold units 11 and 13 are shown located on either side of die 12. Mold units 11 and 13 remain stationary. The parison carrying device of the present invention (not shown in FIG. 1) carries parisons to each of mold units 11 and 13 where the parisons are formed by the molds into finished hollow products. Thus, in the process of the present invention, the parison 10 is moved to the mold units 11 and 13 rather than the mold units 11 and 13 moving to the parison 10. As well, the die 12 need not be located immediately above a mold unit, thus having the advantage of decreasing the overall height of the equipment. Accordingly, many of the disadvantages of the prior art are eliminated.

Figure 2A:
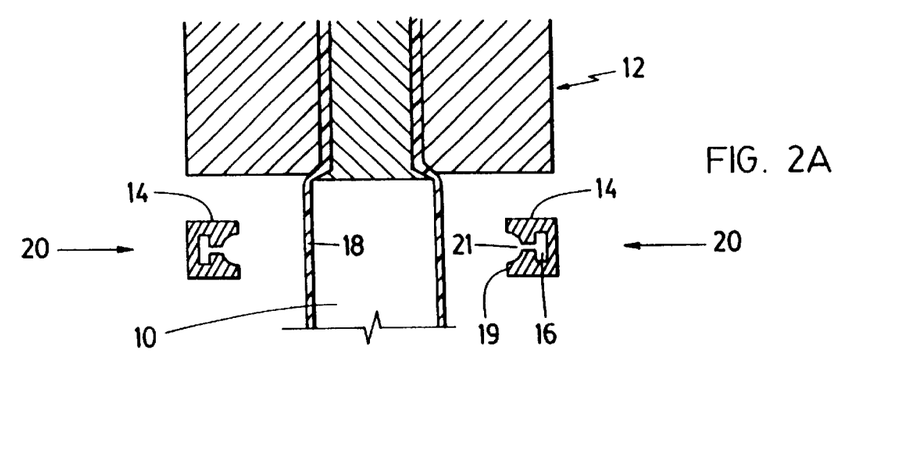
FIGS. 2A–2C show the vacuum method embodiment of the parison carrying device of the present invention.
Figure 2B:
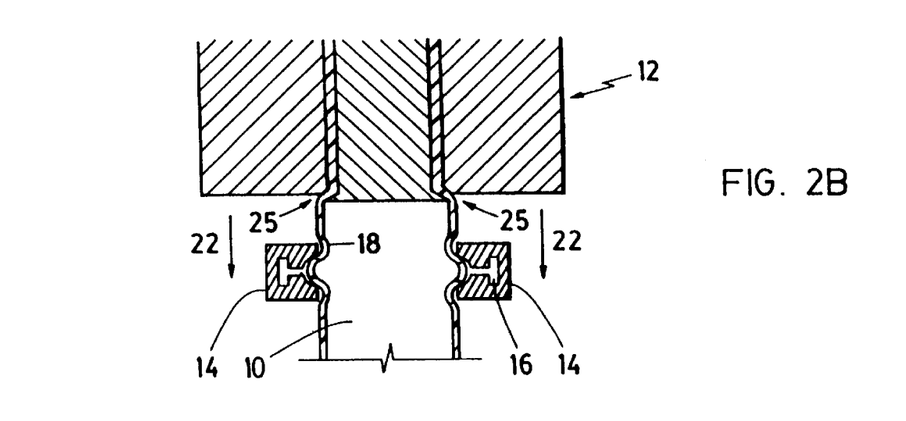
Figure 2C:
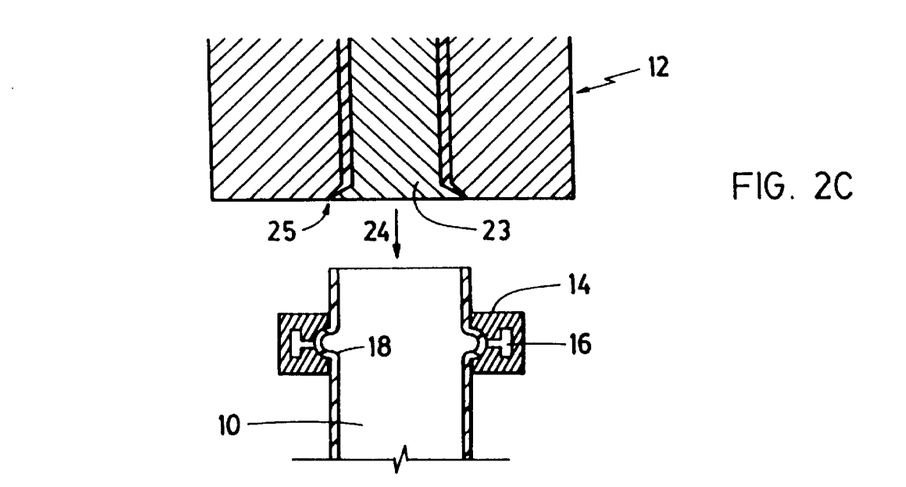

In FIGS. 2A to 2C, there is shown a cross-sectional view of the parison 10 being formed by passage of melted plastic through die 12. The parison 10 is preferably cylindrical in shape. The parison carrying device of the present invention grasps and retains the parison 10, separates the parison 10 from the die 12 without pinching the parison 10 and transports the parison 10 to a mold unit (not shown) also without pinching the parison 10.

The parison carrying device of the present invention allows the parison 10 to be separated from the die 12 and carried to the mold unit without pinching the parison 10, and therefore, without causing the inside of the parison 10 to be closed separation of the parison from the die. The parison carrying device of the present invention does so by providing a stabilizing collar around parison 10 which causes the parison wall 18 in the area of the collar to deform and create a holding geometry whereby the parison 10 is retained by the parison carrying device. The parison wall 18 in the area of the collar is thus firmly retained by the collar, allowing the parison 10 to be separated from the die and carried to the mold unit without pinching.

In the embodiment illustrated in FIGS. 2A to 2C, the parison carrying device of the present invention includes two or more collar means 14 that are initially separated from the parison 10 as shown in FIG. 2A. When the required length of parison 10 has been extruded from the die 12 and is ready to be separated from the die 12 and carried to the mold unit, collar means 14 are moved towards the parison 10 in the directions of arrows 20 until they are around the parison 10. The interior of each of collar means 14 includes a cavity 16 in which a vacuum is applied by known means. The cavity 16 extends to the inner face 19 of collar means 14 and terminates at notch 21. As collar means 14 contact the parison wall 18 (FIG. 2B) the vacuum applied in cavity 16 causes the parison wall 18 in the area of collar means 14 to be deformed and "sucked" into notch 21. The portion of the parison wall 18 that is so sucked into notch 21 is retained therein. This action of the collar means 14 on the parison wall 18 creates a holding geometry that retains the parison wall 18 in the collar means 14. Once the holding geometry on parison wall 18 is formed, the parison carrying device is able to hold and retain the parison 10 without pinching of the parison walls 18.

Therefore, in this first embodiment of the parison carrying device of the present invention, collar means 14 first move in the direction of arrows 20 as shown in FIG. 2A until the inner face 19 is in contact with the parison wall 18. Once the parison wall 18 is retained by the collar means 14, as described above, the parison carrying device moves in the direction of arrows 22 in FIG. 2B. Since the parison 10 is retained within the parison carrying device, parison 10 also moves in the direction of arrows 22, thereby separating and removing parison 10 from die 12 without pinching the parison wall 18. To facilitate separation of the parison 10, the die 12 may optionally be provided with a rod 23 disposed within the opening 25 of the die 12. Rod 23 can be moved (typically by a hydraulic piston which not shown) so that the opening 25 is closed, thereby cutting the parison 10 from the molten plastic in the die 12 and separating it from the die 12. The parison 10 is then carried by the parison carrying device to one of mold units 11 or 13 (not shown in FIGS. 2A to 2C) for processing into a hollow product, such as an automobile fuel tank. Since parison 10 is not pinched when it is separated from die 12 or transported to the mold unit, it is unlikely to collapse or flatten over its entire length, thus making it easy to ensure that parison 10 is properly placed within the mold unit.

Figure 3A:
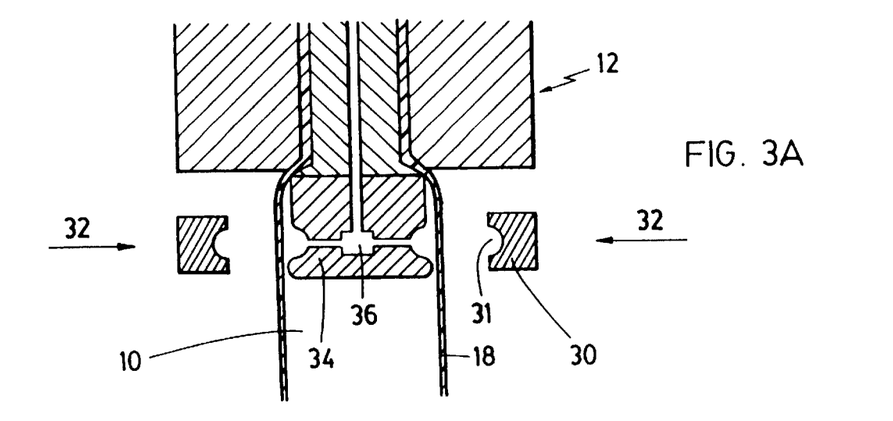
FIGS. 3A–3C show the pressure method embodiment of the parison carrying device of the present invention.
Figure 3B:
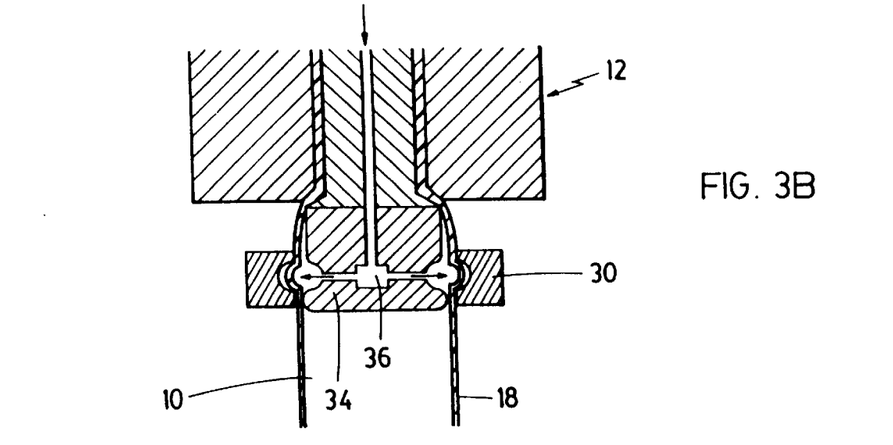
Figure 3C:
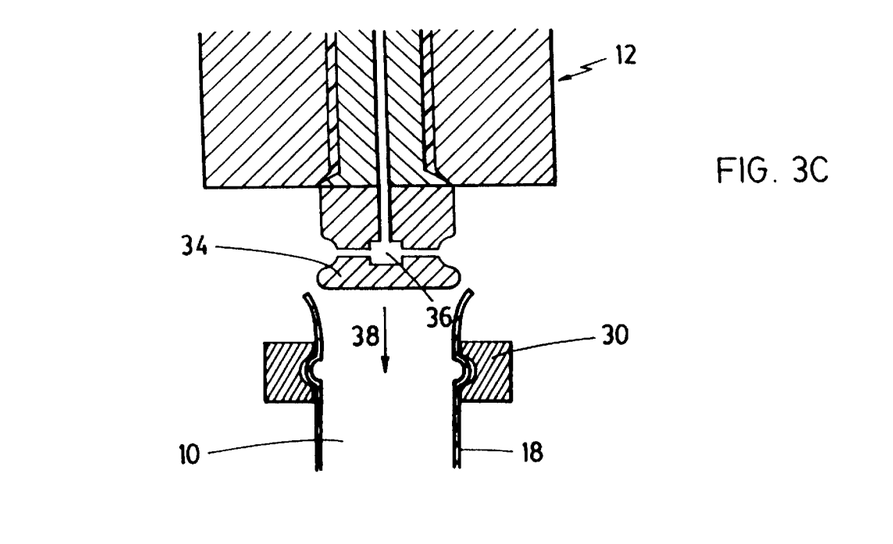

FIGS. 3A–3C show in cross-sectional view a second embodiment of the parison carrying device of the present invention, namely the use of pressure rather than vacuum. In this embodiment, the parison carrying device includes at least two second collar means 30. Second collar means 30 differ from collar means 14 of FIGS. 2A to 2C in that second collar means 30 do not have a cavity 16 in which vacuum is applied, although second collar means 30 have a notch 31 similar to the notch 21 of collar means 14.

As shown in FIG. 3A, parison 10 is formed by die 12. Second collar means 30 are initially separated from parison wall 18. When the required length of parison 10 is extruded and the parison 10 is to be separated from die 12, second collar means 30 are moved towards the parison wall 18 in the direction of arrows 32 until second collar means 30 contact the parison wall 18.

The parison carrying device illustrated in FIGS. 3A to 3C includes a core member 34 disposed adjacent to the opening of die 12. Core 34 comprises a series of inner passage ways 36 including passages that extend radially from the centre of core 34 and terminate at the peripheral face of core 34. As better illustrated in FIG. 3B, once second collar means 30 are around parison wall 18, increased pressure is applied in passage ways 36 of core 34. Since the passage ways 36 extend radially through the core member 34 and terminate opposite notch 31 of second collar members 34, the increased pressure within passage ways 36 causes the parison wall 18 to be "pushed" against second collar means 30 and into notch 31. The portion of the parison wall 18 in the notch 31 is retained therein, thus the internal pressure within passage ways 36 forces the parison wall 18 to form the holding geometry in second collar means 30.

Once the holding geometry is formed within second collar means 30, the parison carrying device is moved in the direction of arrow 38, thereby separating and removing parison 10 from die 12 without pinching parison wall 18. Parison 10 can then be transported to the mold units also without pinching thereby alleviating the risk of the parison 10 flattening and collapsing onto itself.

Figure 4A:
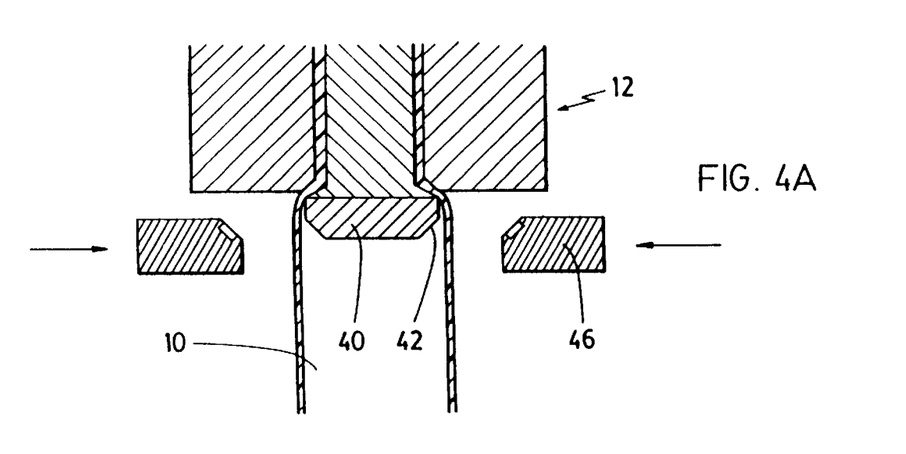
FIGS. 4A–4C show the mechanically pressing method of the parison carrying device of the present invention.
Figure 4B:
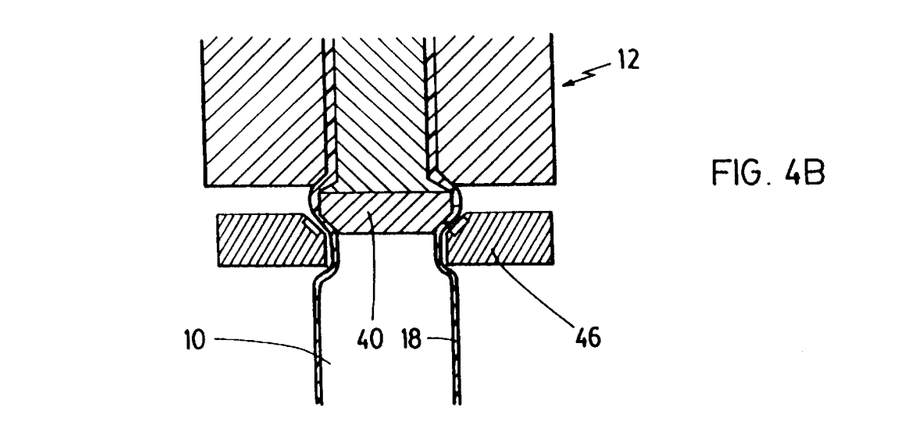
Figure 4C:
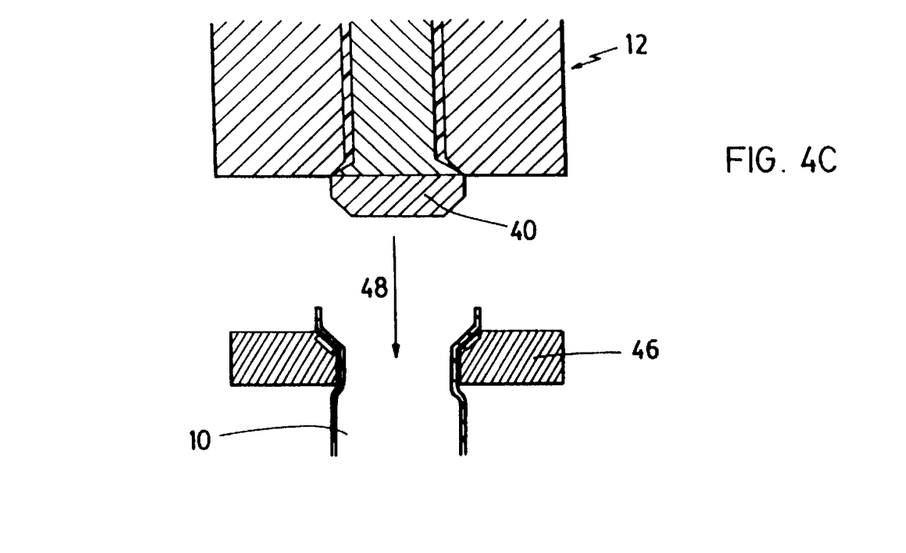

A third embodiment of the parison carrying device of the present invention is illustrated in FIGS. 4A–4C. This third embodiment uses a mechanically pressing method for creating the holding geometry on parison wall 18. In FIG. 4A, parison 10 is shown being formed by die 12. In this embodiment of the present invention, a core 40 is disposed adjacent the opening of die 12. Core 40 includes slanting annular face 42. The parison carrying device shown in FIGS. 4A to 4C comprises at least two third collar means 46 also having slanted faces 47 corresponding to annular face 42. As shown in FIG. 4B, when third collar means 46 are moved to contact parison wall 18, the portion of the parison wall 18 in the area of third collar means 46 is trapped between annular face 42 and the corresponding slanting faces 47 on third collar means 46. This creates the holding geometry for parison wall 18, thereby retaining parison 10 in the parison carrying device.

In FIG. 4C, the parison carrying device is shown moving in the direction of arrow 48. As such, parison 10 is separated and removed from die 12 without pinching of the parison wall 18.

Figure 5A:
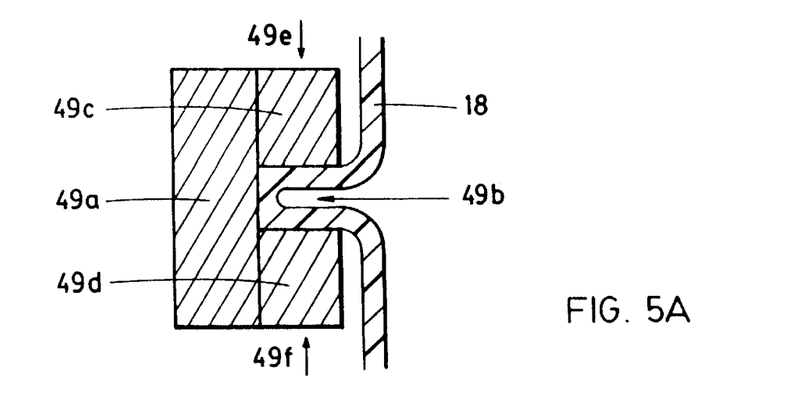
FIGS. 5A–5C show a further embodiment of the parison carrying device of the present invention.
Figure 5B:
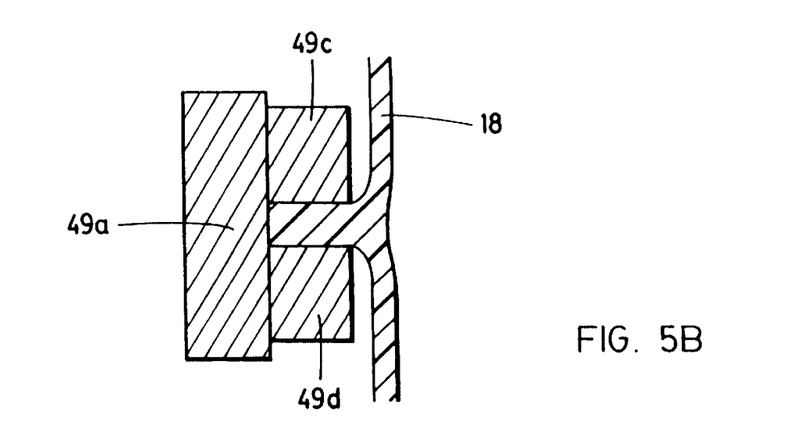
Figure 5C:
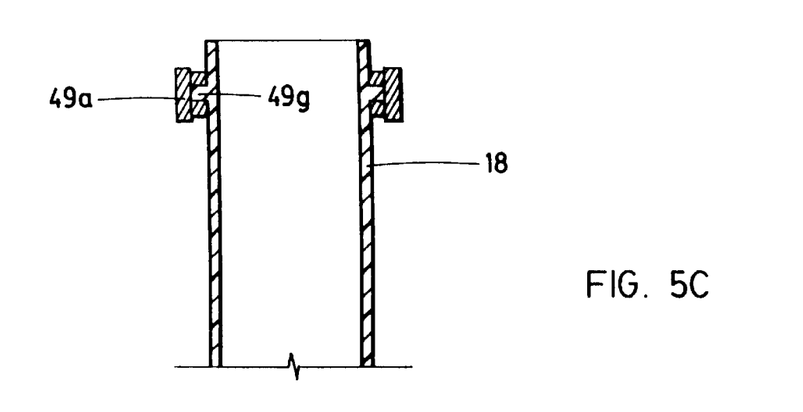

A fourth embodiment is illustrated in FIG. 5A to 5C. FIG. 5A is a close up view of a collar means 49a. On the inner face of collar means 49a is a notch 49b defined by two slidably mounted elements 49c and 49d. Parison wall 18 is shown after collar means 49a was placed in contact with the parison 10 and a portion of parison wall 18 forced into notch 49b by one of the methods shown in FIGS. 2A–2C or FIGS. 3A–3C.

Once parison wall 18 is in notch 49b, elements 49c and 49d are moved in the direction of arrows 49e and 49f, respectively, as shown in FIG. 5B. The portion of parison wall 18 within notch 49b is thereby squeezed between elements 49c and 49d. The result is an annular ridge 49g of the parison wall 18 circling around parison 10. The annular ridge 49g is retained in the notch 49b, thereby forming a holding geometry allowing parison 10 to be carried securely by the parison carrying device. This fourth embodiment of the parison carrying device is useful for bigger, heavier parisons as the holding geometry created provides a firmer hold on the parison 10.

Therefore, the four embodiments of the parison carrying device of the present invention illustrated in FIGS. 2 to 5 create a holding geometry of various sizes and shapes on the portion of the parison 10 in the area of the collar means. The holding geometry is, in essence, a pocket of parison wall 18 formed near the upper end of parison 10 which allows parison 10 to be retained by the collar means without pinching the parison 10. Therefore, the parison carrying device of the present invention allows the upper end of the parison 10 to remain opened (that is, not pinched), while at the same time, providing a strong retaining grip on the parison 10 for carrying it to the mold area.

For a large number of products made using the extrusion blow molding process, it is required that the parison, once it is located in the mold unit, be pressurized prior to closing of the mold unit. Typically, the parison is pressurized to pressures of about 1.5 to 2 psi. As such, the upper end of the parison, which remains open when the parison carrying device of the present invention is used, must be closed so that the parison can be suitably pressurized.

FIGS. 6 to 9 illustrate various embodiments of the present invention that allow for the parison's open upper end to be closed for pre-inflation purposes. In the specific embodiment shown in FIGS. 6A–6C, the parison carrying device itself closes the upper end of parison 10. It will be understood that the present invention does not require that the upper end of the parison 10 be closed as shown in FIG. 6C, but rather the embodiment of FIG. 6C is merely an example. As shown in FIG. 6A, the parison carrying device is initially generally square-shaped although other geometric pivoting arm configurations can be used. The parison carrying device comprises two support arms 50 and 52, each having two pinching arms pivotally connected thereto. Parison 10 is separated from a die (not shown) and carried to a mold unit (not shown) by moving support arms 50 towards parison 10, thereby causing the free ends of the pinching arms to contact each other. As such, the parison wall 18 is forced to take the shape defined by the four pinching arms, namely a square shape. The pinching arms act like the collar means described above so as to create a holding geometry to retain parison 10 therein. Thus, parison 10 can then be carried to the mold without pinching, thereby reducing the likelihood of total collapse of parison 10.

Figure 6A:
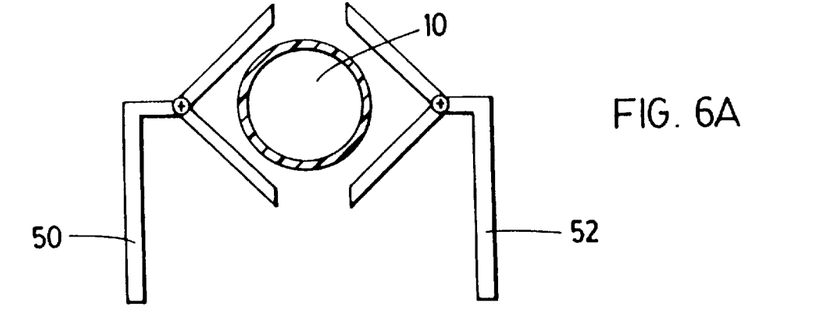
FIGS. 6A–6C show the direct closing of the open end of the parison by the parison carrying device.
Figure 6B:
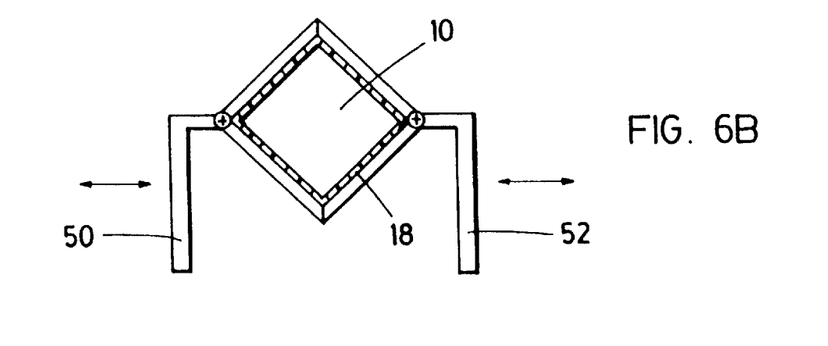
Figure 6C:
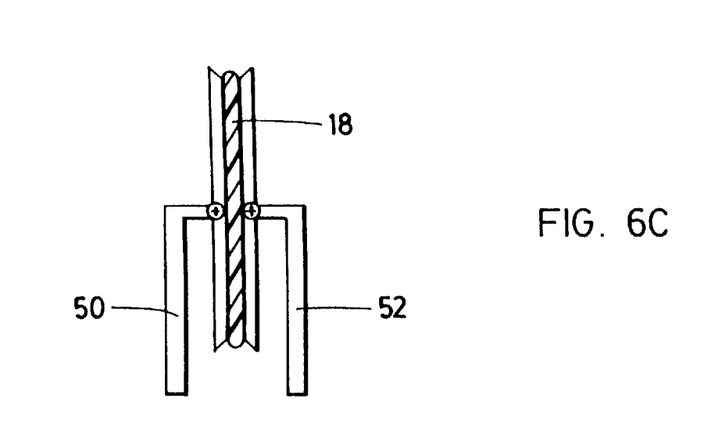

Once parison 10 is properly located in the mold unit, support arms 50 and 52 are moved closer, causing the two pinching arms on each of support arms 50 or 52 to straighten, thereby pinching the upper end of parison 10 by bringing the parison wall 18 together. As such, the upper end of parison 10 is closed allowing for the interior of parison 10 to be pressurized. The problems associated with the premature collapse of the parison are eliminated because parison 10 is already properly located in the mold unit prior to pinching of its upper end. If total collapse occurs, the result is insignificant since the parison 10 is already properly located in the mold unit.

Figure 7A:
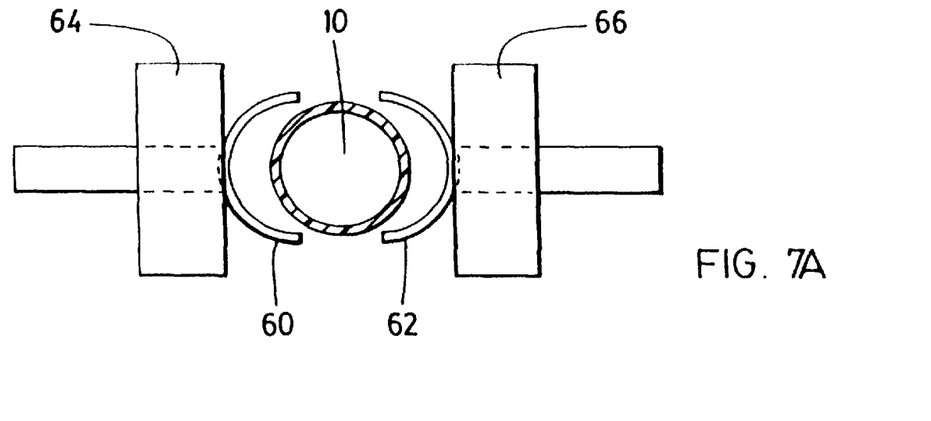
FIGS. 7A–7C show the closing of the open end of the parison by a separate closing mechanism disposed on the parison carrying device.
Figure 7B:
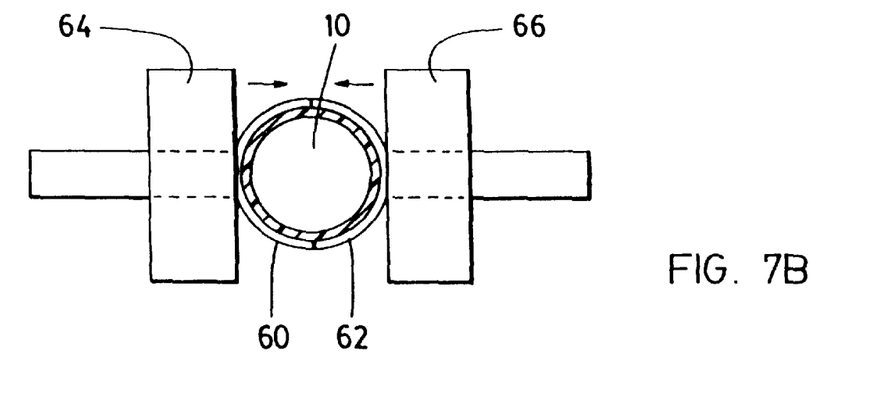
Figure 7C:
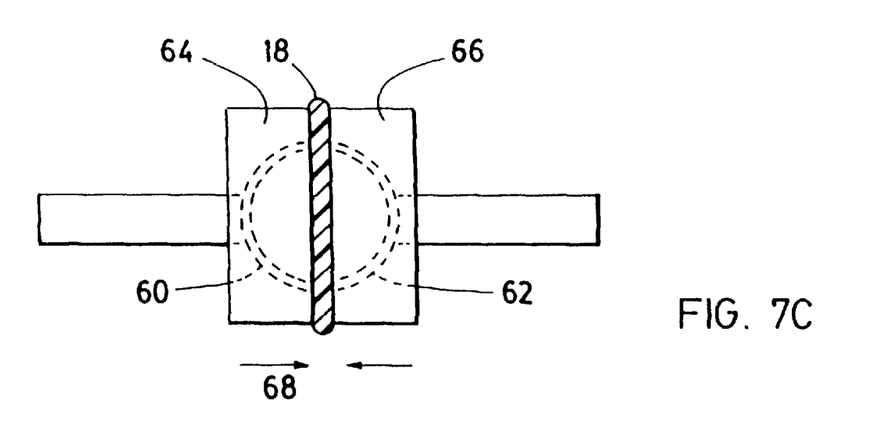

In the embodiment shown in FIG. 7A–7C, the pinching mechanism is separate from the parison carrying device itself. The parison carrying device comprises two collar means 60 and 62, which can be any of the collar means described with reference to FIGS. 2 to 5 above. Disposed above collar means 60 and 62 are pinching blocks 64 and 66. As seen in FIG. 7B, collar means 60 and 62 are brought together around the parison 10 in a manner similar to that described in either of FIGS. 2 to 5 above. Once a holding geometry is created by collar means 60 and 62 and parison 10 is retained within collar means 60 and 62, parison 10 is separated from the die, carried to the mold unit and properly located therein. Pinching blocks 64 and 66 are then moved in the direction of arrows 68 as shown in FIG. 7C until the inside surfaces of parison wall 18 come together and close the upper end of parison 10. As can be seen from FIG. 7C, collar means 60 and 62 retain their original shape in contrast to the embodiment of FIG. 6.

Figure 8A:
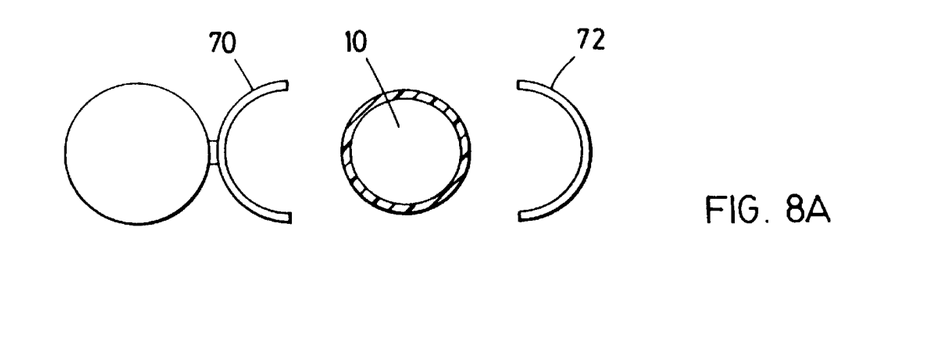
FIGS. 8A–8D show the closing of the open end of the parison by a lid or lid segments disposed on the parison carrying device.
Figure 8B:
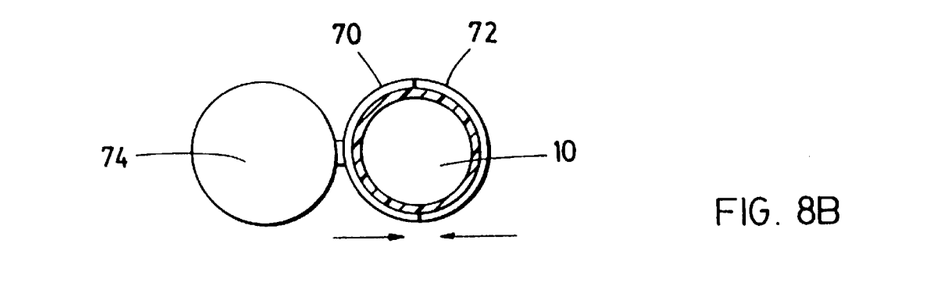
Figure 8C:
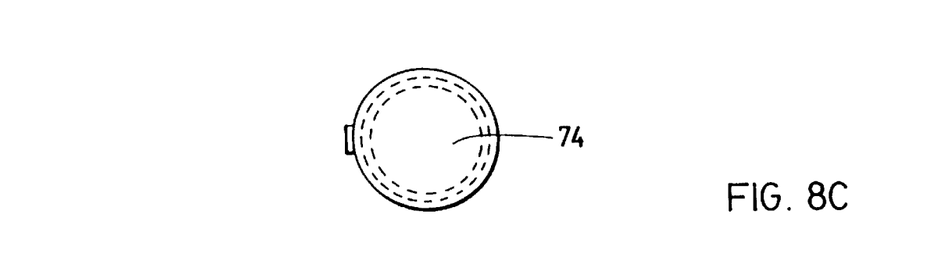

FIGS. 8A–8D show a further embodiment of the parison carrying device of the present invention. In this embodiment, a lid or lid segments are used to close the upper end of parison 10. The parison carrying device comprises two collar means 70 and 72 of the type described with reference to FIGS. 2 to 5. Pivotally connected to either one of the collar means 70 or 72 is a lid 74. The parison carrying device illustrated in FIGS. 8A to 8D functions essentially like the parison carrying device described with reference to FIG. 2 to 5 above. Once collar means 70 and 72 are in place and parison 10 is retained therein as shown in FIG. 8B, the parison 10 can be separated from the die. Lid 74 can then be pivoted about its pivot axis until lid 74 covers the opening at the upper end of parison 10 as shown in FIG. 8C. Suitable locking means may be added to keep lid 74 in place when the parison 10 is pressurized, although this may not be necessary because of the relatively small pressures used in the pre-inflation stage.

Figure 8D:
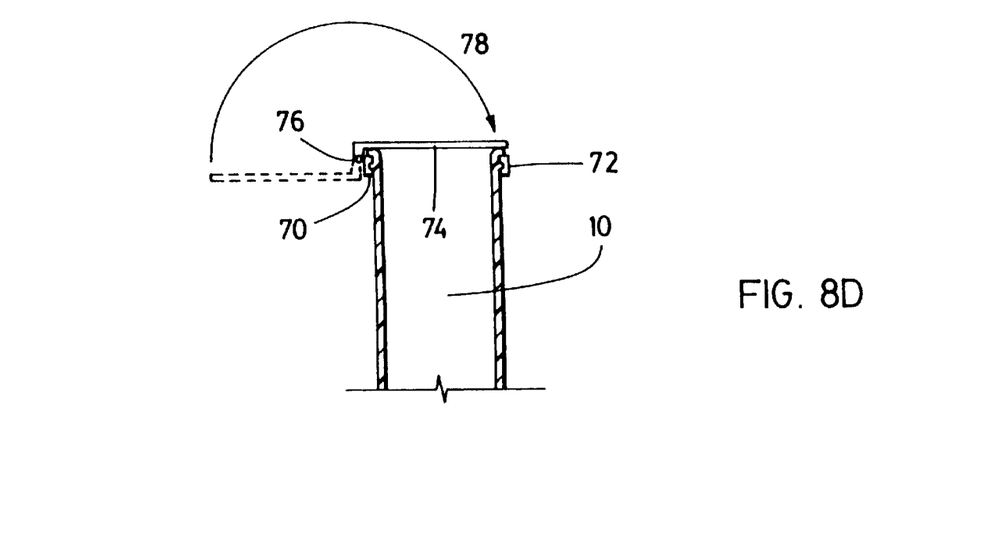

FIG. 8D is a cross-sectional view of parison 10 at its upper end. Parison 10 is retained by collar means 70 and 72, thereby keeping the upper end of parison 10 open. Lid 74 is then pivoted about its pivot axis 76 in the direction of arrows 78 until lid 74 comes to rest at the top of the parison 10 and closes the open end of the parison 10. In contrast to the closing mechanisms of the embodiments in FIG. 6 and 7, parison 10 is not pinched in this case, thus lid 74 can be moved to its closing position at any time after parison 10 is removed from the die. In the embodiments of FIG. 6 and 7, the parison 10 is preferably first properly located in the mold unit prior to closing the upper end by pinching to avoid the likelihood of total collapse of the parison.

Figure 9A:
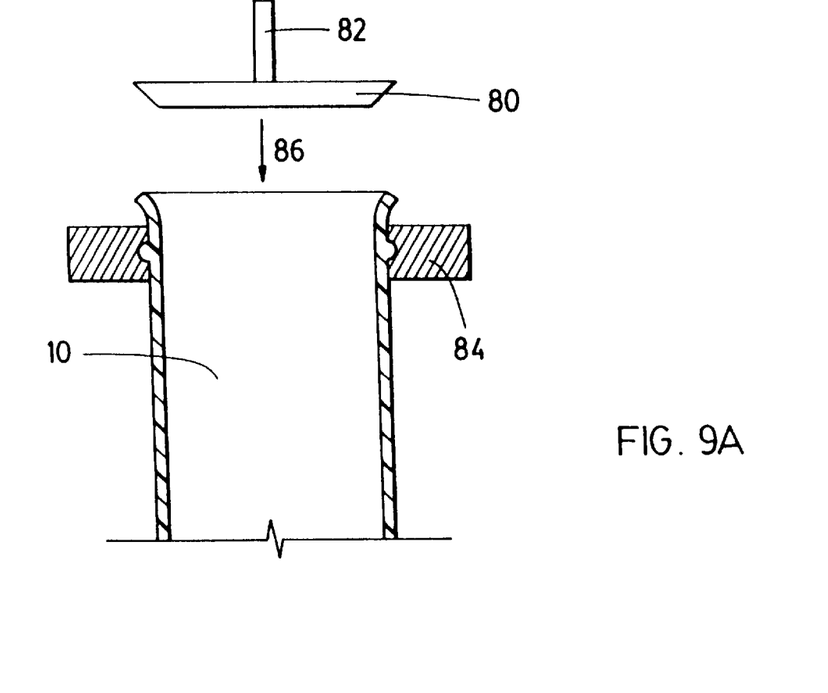
FIGS. 9A–9B show the closing of the open end of the parison by a plunger.
Figure 9B:
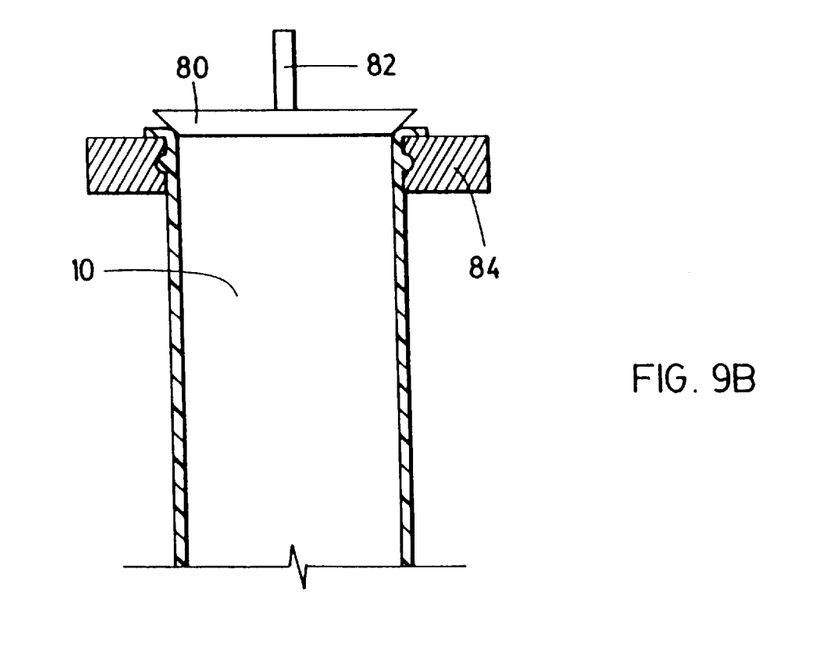

A fourth embodiment of the closing means for the parison carrying device of the present invention is illustrated in FIGS. 9A and 9B. In this embodiment, a plunger 80 and associated support 82 are used. Once the parison 10 has been removed from the mold cavity, and while it is being retained by the parison carrying device 84, the plunger 80 is moved in the direction of arrow 86 until it is inserted into the open upper end of the parison 10. As such, the upper end of parison 10 is thereby closed allowing for pressure build-up in the parison 10. Again, since the parison 10 is not pinched, the upper end can be closed before the parison is properly located in the mold.

Figure 10:
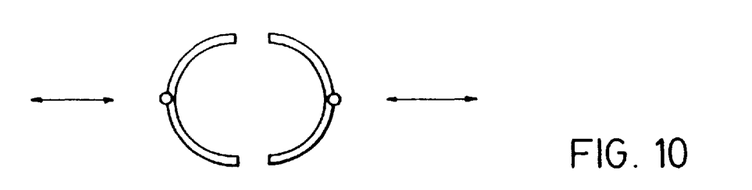
FIG. 10 shows an embodiment of the parison carrying device of the present invention in which the collar means has a round shape.
Figure 11:
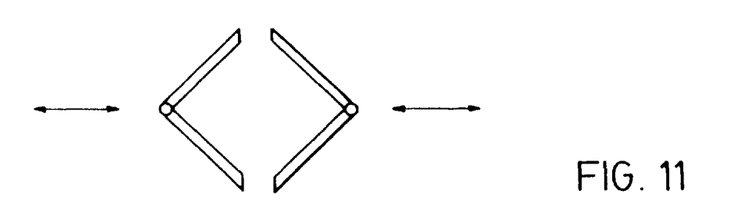
FIG. 11 shows an embodiment of the parison carrying device of the present invention in which the collar means has a square shape.
Figure 12:
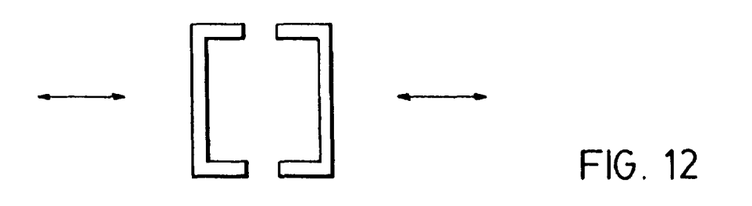
FIG. 12 shows an embodiment of the parison carrying device of the present invention in which the collar means has a rectangular shape.
Figure 13:
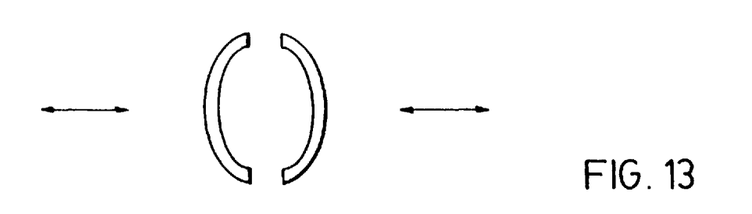
FIG. 13 shows an embodiment of the parison carrying device of the present invention in which the collar means has an oval shape.
Figure 14:
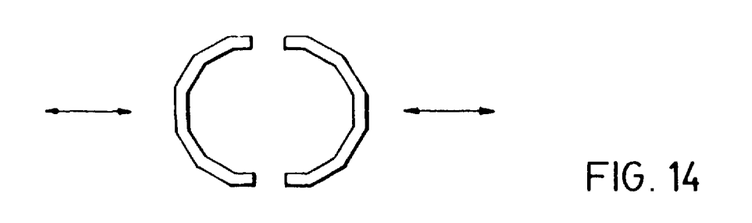
FIG. 14 shows an embodiment of the parison carrying device of the present invention in which the collar means has N-corners.

It will be understood that the parison carrying device of the present invention is not limited to any of the shapes illustrated in FIGS. 2 to 9 above. For example, the parison carrying device of the present invention can comprise collar means of varying sizes shapes, and pivotion pinching configurations, including the following examples:

FIG. 10: round or circular shape;

FIG. 11: square or diamond shape;

FIG. 12: rectangular shape;

FIG. 13: oval shape;

FIG. 14: a polygon having N-corners; and

Figure 15:
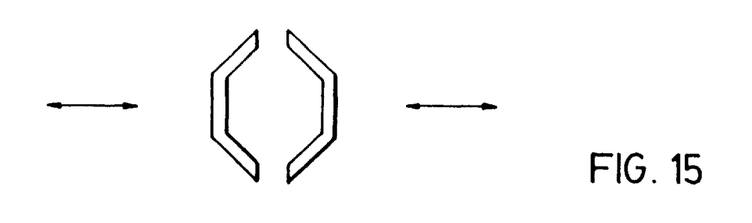
FIG. 15 shows an embodiment of the parison carrying device of the present invention in which the collar means has a hexagonal shape.

FIG. 15: hexagonal shape.

One of the important aspects of the examples illustrated in FIGS. 10 to 15 is that the collar means assist in creating a holding geometry near the upper end of the parison allowing the parison to be retained therein without pinching. The parison can then be separated from the die and transported to the mold unit.

Figure 16A:
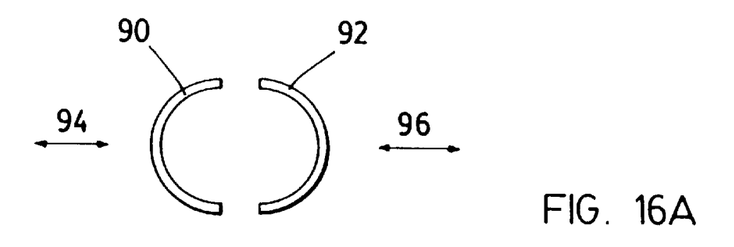
FIGS. 16A–16C illustrate the opening and closing movements of the collar means of the parison carrying device of the present invention.
Figure 16B:
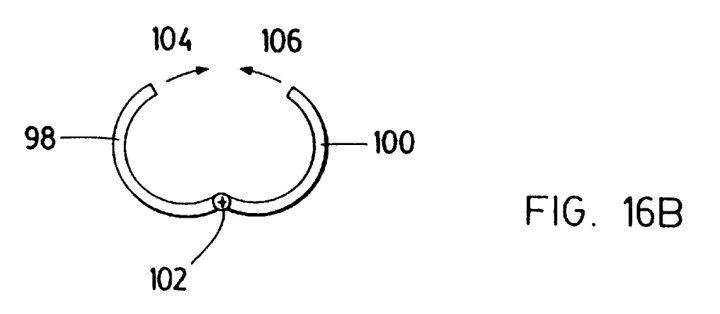

Furthermore, the movement of the parison carrying device of the present invention is not limited to linear movement. For example, in FIG. 16A, two circular collar means 90 and 92 are shown as capable of moving in a linear manner in the direction of arrows 94 and 96, respectively. In FIG. 16B, collar means 98 and 100 are also circular in shape, however, collar means 98 and 100 do not move in a linear direction, but rather pivot about a pivot point 102. Thus, collar means 98 and 100 swing in the direction of arrows 104 and 106, respectively, until they are around the parison.

Figure 16C:
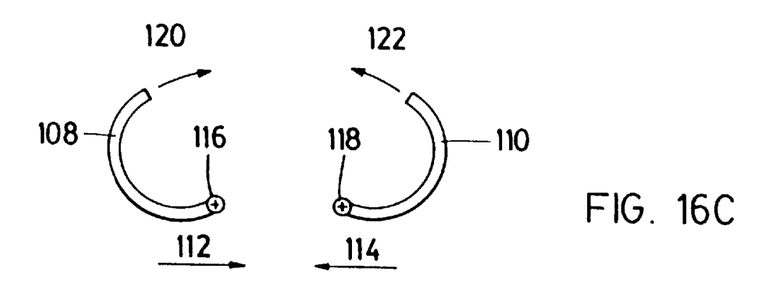

In FIG. 16C, a combination of the linear and pivotal movements are shown. Collar means 108 and 110 move linearly in the directions of arrows 112 and 11 4, respectively, and also pivot about pivot points 116 and 118, respectively, so that collar means 108 and 110 swing in the directions of arrows 120 and 122.

In summary of this disclosure, the parison carrying device of the present invention includes collar means that assist in creating a holding geometry near the upper end of the parison that allows the parison to be retained within the carrying device without pinching the parison wall. The parison can then be separated from the die and transported to the mold unit. The mold unit can thus be stationary and need not be located immediately below the die. As well, the present invention provides means for closing the open end of the parison in applications where a pressure must be built up within the parison prior to the mold closing.

Modifications and alterations are possible and all such modifications and alterations are within the sphere and scope of the present invention as described herein.

I claim:

1. A method of transporting a parison having a finite length, an upper end and an outside wall from an extrusion die to a second location during manufacture of blow-molded products, the method comprising the steps of:
    a) vertically extruding the parison from the die;
    b) providing two collar means each comprising two hinged pinching arms having inner faces that define a non-circular geometry;
    c) contacting the inner faces of the collar means with the upper end of the parison to create a holding geometry between the collar means and the parison, wherein the outside wall of the parison conforms to the shape of the inner faces of the collar;
    d) deforming the upper end of the parison to conform to the non-circular geometry of the inner faces, whereby the parison is retained by the collar means without closing the parison anywhere over its length;
    e) separating the parison from the die without closing the parison anywhere over its length; and
    f) transporting the parison to the second location by moving the collar means without closing the parison anywhere over its length.

2. The method of claim 1, wherein the parison is cylindrical in shape.

3. The method of claim 1, wherein the inner faces define a square geometry when the collar means are in contact with the upper end of the parison.

4. A method of transporting a parison having finite length an upper end and an outside wall from an extrusion die to a second location during manufacture of a blow-molded product, the method comprising the steps of:
    a) vertically extruding the parison from the die;
    b) providing two collar means each comprising two hinged pinching arms having inner faces that define a non-circular geometry;
    c) contacting the inner faces of the collar means with the upper end of the parison to create a holding geometry between the collar means and the parison, wherein the outside wall of the parison conforms to the shape of the inner faces of the collar;
    d) deforming the upper end of the parison to conform to the non-circular geometry of the inner faces whereby the parison is retained by the collar means without closing the parison anywhere over its length;
    e) separating the parison from the die without closing the parison anywhere over its length;
    f) transporting the parison to the second location by moving the collar means without closing the parison anywhere over its length; and
    g) closing the upper end of the parison when the parison is in the second location by bringing the collar means closer together thereby straightening the pinching arms.

5. The method of claim 4, wherein the parison is cylindrical in shape.

6. The method of claim 4, wherein inner face define a square geometry when the collar means are in contact with the upper end of the parison.

* * * * *

UNITED STATES PATENT AND TRADEMARK OFFICE
CERTIFICATE OF CORRECTION

PATENT NO.    : 6,183,683 B1
DATED         : February 6, 2001
INVENTOR(S)   : Hans Schwochert It is certified that error appears in the above-identified patent and that said Letters Patent is hereby corrected as shown below:

Column 7,
Line 27, after "closed" delete "separation of the parison from the die".

Column 11,
Line 15, "pivotion pinching" should read --pivoting pinching--.
Line 43, "and 11 4" should read --and 114--.

Signed and Sealed this

Fourteenth Day of August, 2001

*Attest:*

*Attesting Officer*

NICHOLAS P. GODICI
*Acting Director of the United States Patent and Trademark Office*